Dec. 1, 1936.          C. S. GILLETTE          2,062,305
                        SEALING MEANS
                      Filed Oct. 11, 1934
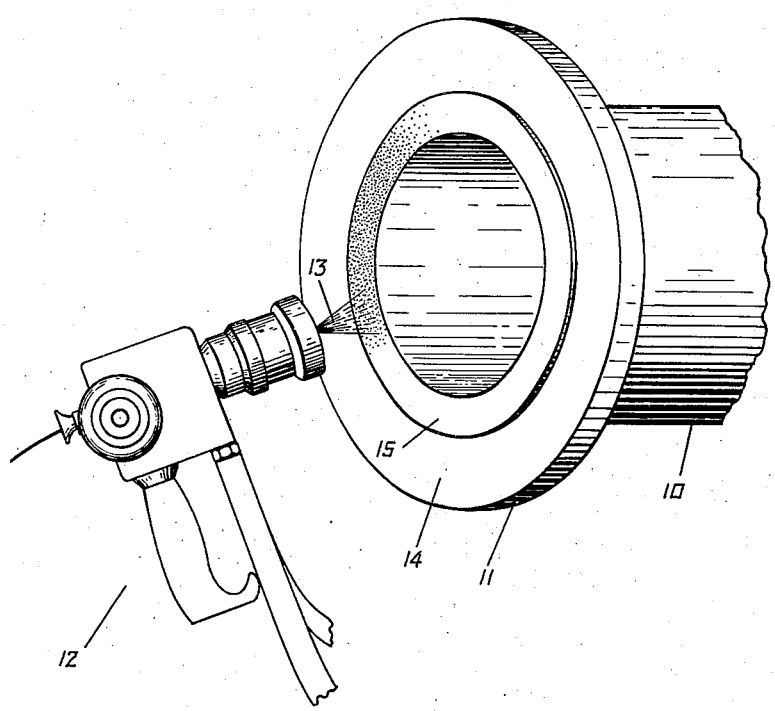
INVENTOR
C.S. GILLETTE.
BY
ATTORNEY Patented Dec. 1, 1936

2,062,305

UNITED STATES PATENT OFFICE 2,062,305

SEALING MEANS

Claude S. Gillette, United States Navy

Application October 11, 1934, Serial No. 747,868

2 Claims. (Cl. 285—130)

(Granted under the act of March 3, 1883, as amended April 30, 1928; 370 O. G. 757)

This invention relates to a metallic gasket to be used on a flanged joint and to a method for forming the metallic gasket in situ on one flange face of a flanged joint with which it is to be used.

It is often difficult to properly position the usual type of gasket on a flanged joint because of the difficulty of causing the gasket to remain properly centered in position while a flanged section is being secured to a mating flanged section. With the majority of flanged joints, the flanges usually project a substantial amount outside of the bolt circle and unless the gasket is of this full width it is difficult to center the usual loose gasket properly on one flange while securing the mating flange thereto; in addition, a full face gasket seriously reduces the gasket pressure often resulting in difficulty in making a tight joint. With this invention, however, the gasket will be made of metal a width most suitable for the work and will be formed in position on one of the flange faces so as to adhere directly to the metal of the flange thereby eliminating any difficulty in positioning the same, for, when so formed and positioned, it will be in effect an inherent part of the flange face yet will, preferably, be of somewhat softer metal or composition than the flange and thus act as a gasket as the flange on which it is formed and the mating flange are secured together; thus also one joint between gasket faces and flange faces is eliminated leaving but one parting line to be tightened against leakage by the flange bolt stress.

While the invention has been illustrated as being applied to the joint flange face of a pipe, the invention may equally be applied to the surface of any joining face which is to be joined up and pressed against the surface of another joining face. Thus a motor block and cylinder head of a combustion engine may utilize the gasket of the present invention.

With these and such other objects in view as will incidentally appear hereinafter, the invention comprises the novel method and article that will now be described with reference to the accompanying diagrammatic drawing forming a part of the present disclosure and illustrating by way of example a practical embodiment of the carrying out of the invention.

As illustrated, a pipe 10 is shown having a flange 11 externally projecting therefrom at one end thereof to be used as part of the pipe joint in securing the pipe section 10 to a similar adjacent pipe section. The pipe section 10 may be a part of any type of pipe, flanged casing, or head, such as an oil line, gas or steam line, water line, turbine casing, or the like. There is shown at 12 a diagrammatic representation of a spraying apparatus which, when properly operated, exudes a spray of molten metal or composition 13 which may deposit on any surface and is here shown as depositing on the face 14 of the flange 11. Spray 13 is deposited by suitable manipulation of the spraying apparatus 12 so as to build up on the face 14 of the flange 11 the metal gasket 15 of this invention, the spray 13 being properly and suitably manipulated about the face 14 so as to form the gasket 15 of a desired thickness and width.

The particular spraying apparatus 12, diagrammatically shown, is no part of this particular invention and its construction and operation is well known in the art, examples of which are illustrated in the patents to Saeger 1,940,814 and to Rapp, 1,880,331, and hence need not be particularly described herein.

The gasket 15 need not necessarily be formed by the spraying method herein shown but may, if desired, be formed by a fusion-welding process by proper manipulation of a welding tool over the surface 14 of the flange 11 so as to deposit and form the gasket 15 in situ thereon in the same manner as the spray 13 is deposited to form the gasket 15, as shown.

The invention described herein may be manufactured and used by or for the Government of the United States of America for governmental purposes without the payment of any royalties thereon or therefor.

I claim:

1. Means for sealing between the adjacent faces of two connected flanged pipes comprising a gasket-like ring applied to the face of one of the flange members, the material of said ring having the characteristics of sprayed metal whereby when the second flanged pipe is brought into abutting relation the sealing material will be placed under sufficient pressure to flow into any irregularities which may exist between the pipe ends.

2. Means for sealing between the adjacent faces of two connected flanged pipes comprising a gasket-like ring applied to the face of one of the flange members, the material of said ring having the characteristics of sprayed metal in being soft, porous, and compressible, whereby when the second flanged pipe is brought into abutting relation the sealing material will be placed under sufficient pressure to flow into any irregularities which may exist between the pipe ends.

C. S. GILLETTE.